(12) United States Patent
Ansari et al.

(10) Patent No.: US 9,100,266 B2
(45) Date of Patent: Aug. 4, 2015

(54) SOFTROUTER PROTOCOL FAILOVERS

(75) Inventors: Furquan Ahmed Ansari, Middletown, NJ (US); Tirunell V. Lakshman, Morganville, NJ (US); Thyagarajan Nandagopal, Middletown, NJ (US); Ramachandran Ramjee, Summit, NJ (US); Thomas Y. Woo, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 930 days.

(21) Appl. No.: 11/147,665

(22) Filed: Jun. 8, 2005

(65) Prior Publication Data

US 2006/0092975 A1 May 4, 2006

Related U.S. Application Data

(60) Provisional application No. 60/623,885, filed on Nov. 1, 2004.

(51) Int. Cl.
*H04L 12/701* (2013.01)
*H04L 12/70* (2013.01)

(52) U.S. Cl.
CPC ......... *H04L 45/00* (2013.01); *H04L 2012/5627* (2013.01)

(58) Field of Classification Search
CPC .. H04L 45/00; H04L 45/28; H04L 2012/5627
USPC ......................................... 370/219, 220, 469
See application file for complete search history.

(56) References Cited

U.S. PATENT DOCUMENTS

| | | | | |
|---|---|---|---|---|
| 6,345,315 | B1 * | 2/2002 | Mishra | 719/329 |
| 6,633,560 | B1 * | 10/2003 | Albert et al. | 370/351 |
| 6,697,329 | B1 * | 2/2004 | McAllister et al. | 370/235 |
| 6,912,197 | B2 * | 6/2005 | Mahamuni | 370/219 |
| 6,996,842 | B2 * | 2/2006 | Strahm et al. | 726/13 |
| 7,069,343 | B2 | 6/2006 | Goringe et al. | |
| 7,075,904 | B1 | 7/2006 | Manish et al. | |
| 7,194,653 | B1 * | 3/2007 | Hadders et al. | 714/4 |
| 7,197,664 | B2 * | 3/2007 | Khosravi | 714/12 |
| 7,286,468 | B2 * | 10/2007 | Scudder et al. | 370/219 |

(Continued)

FOREIGN PATENT DOCUMENTS

| | | |
|---|---|---|
| EP | 1 152 631 A2 | 11/2001 |
| JP | 2000-253053 | 9/2000 |

(Continued)

OTHER PUBLICATIONS

Forwarding and Control Element Separation (ForCES) Framework, RFC 3746 by Yang et al. Apr. 30, 2004.*

(Continued)

*Primary Examiner* — Mohammad Anwar
(74) *Attorney, Agent, or Firm* — Wall & Tong, LLP

(57) ABSTRACT

The SoftRouter architecture separates the implementation of control plane functions from packet forwarding functions. In this architecture, all control plane functions are implemented on general purpose servers called the control elements (CEs) that may be multiple hops away from the forwarding elements (FEs). A network element (NE) or a router is formed using dynamic binding between the CEs and the FEs. There is a protocol failover mechanism for handling failovers initiated by FEs to transfer control from one CE to another CE.

15 Claims, 8 Drawing Sheets

(56) References Cited

U.S. PATENT DOCUMENTS

| | | | |
|---|---|---|---|
| 7,324,439 B2* | 1/2008 | Loo | 370/217 |
| 7,353,259 B1* | 4/2008 | Bakke et al. | 709/208 |
| 7,428,219 B2* | 9/2008 | Khosravi | 370/254 |
| 8,068,408 B2 | 11/2011 | Ansari et al. | |
| 2002/0191250 A1 | 12/2002 | Graves et al. | |
| 2003/0028641 A1 | 2/2003 | Zhang | |
| 2003/0069975 A1 | 4/2003 | Abjanic et al. | |
| 2003/0208585 A1 | 11/2003 | Shinomiya et al. | |
| 2004/0083403 A1 | 4/2004 | Khosravi | |
| 2004/0254384 A1 | 12/2004 | Manzer et al. | |
| 2005/0050136 A1 | 3/2005 | Golla | |
| 2005/0190783 A1 | 9/2005 | Khosravi | |
| 2005/0254438 A1 | 11/2005 | Turk et al. | |
| 2008/0165686 A1 | 7/2008 | Lake et al. | |
| 2012/0239626 A1 | 9/2012 | Aysan et al. | |

FOREIGN PATENT DOCUMENTS

| | | |
|---|---|---|
| JP | 2002-026990 | 1/2002 |
| JP | 2003-318899 | 11/2003 |

OTHER PUBLICATIONS

Partial Search Report in corresponding EP 05 25 6625, Dec. 23, 2005, Lucent Technologies Inc.
Gopal R: "Seperationof control and forwarding plane inside a network element" High Speed Networks and Multimedia Communications 5$^{th}$ IEEE International Conference on Jul. 3-5, 2002, Piscataway, NJ USA, IEEE, Jul. 3, 2002, pp. 161-166, XP010603016 ISBN: 0-7803-600-5.
Supplementary Search Report in corresponding EP 05 25 6625, Feb. 22, 2006, Lucent Technologies Inc.
Gopal R, Balakrishan S: "NPF HA Service API Implementation Agreement" 'Online! Jul. 6, 2004, Network Processing Forum Software Working Group, Fremont, XP002365952 Retrieved from the Internet: URL: http://www.npforum.org/techinfo/HA_Service.pdf> retrieved on Feb. 2, 2006! Chapter 4, 5, 6, 7.3.
Doria (Co-Editor) ETRI A: "ForCES Protocol Specification" IETF Standard-Working-Draft, Internet Engineering Task Force, IETF, CH, vol. forces, No. 1, Oct. 25, 2004, XP015018475 ISSN: 0000-0004 Chapter 8.
Alex Adu Alcatel USA Inc RAM Gopal Nokia Hormuzd Khosravi Intel Chaoping Wu Azanda Network Devices: "ForwArding and Control ElemenT protocol (Fact)" IETF Standard-Working-Draft, Internet Engineering Task Force, IETF, CH, No. 6, Nov. 2003, XP015013712 ISSN: 0000-0004 Chapters 3.4, 7.3.
A. Lazar, "Programming Telecommunication Networks," IEEE Network, vol. 11, Sep./Oct. 1997, pp. 8-18.
S. Williams, "The Softswitch Advantage," IEE Review, vol. 48, Issue 4, Jul. 2002, pp. 25-29.
J. Rexford et al., "Network-Wide Decision Making: Toward a Wafer-Thin Control Plane," HotNets, 2004.
L. Yang et al., "Forwarding and Control Element Separation (ForCES) Framework," RFC 3746, 2004.
U.S. Appl. No. 11/147,642, filed Jun. 8, 2005, Lakshman et al.
U.S. Appl. No. 11/147,472, filed Jun. 8, 2005, Ansari et al.
U.S. Appl. No. 11/147,937, filed Jun. 8, 2005, Lakshman et al.
U.S. Appl. No. 11/147,768, filed Jun. 8, 2005, Lakshman et al.
U.S. Appl. No. 11/147,491, filed Jun. 8, 2005, Ansari et al.
Chan, Vien et al., "Control Plane Platform Development Kit (CP-PDK)—Integrating Control Plane and Data Plane," Intel Corporation. Feb. 19, 2003.
Louati, Wajdi et al., "Configurable Software-Based Edge Router Architecture," 4$^{th}$ Workshop on Applications and Services in Wireless Networks. Aug. 2004.
Ansari, Furquan et al., "ForCES Element Bindings and Topology Discovery Protocol," Jul. 10, 2004.
L. Yang et al., "Forwarding and Control Element Separation (ForCES) Framework", Network Working Group Request for Comments: 3746, Apr. 2004.
Ansari et al., "Element Bindings and Topology discovery Protocol—(Slides)".
Lin et al., "Multihop Wireless IEEE 802.11 LANs", 1999 IEEE Int. Conf., vol. 3, pp. 1568-1572.
English Translation of Japanese Appeal Board Decision for Japanese Patent Application Serial No. 2005-317886, mailed Jul. 16, 2013, consists of 14 unnumbered pages.
English Translation of Indian Patent Examination Report for Indian Patent Application Serial No. 1578/CHE/2005, dated Jul. 23, 2013, consists of 2 unnumbered pages.
English Translation of Indian Patent Examination Report for Indian Patent Application Serial No. 1583/CHE/2005, dated Jun. 20, 2013, consists of 3 unnumbered pages.
English Translation of Indian Patent Examination Report for Indian Patent Application Serial No. 1581/CHE/2005, dated Apr. 6, 2013, consists of 3 unnumbered pages.
English Translation of Indian Patent Examination Report for Indian Patent Application Serial No. 1577/CHE/2005, dated Jun. 17, 2013, consists of 3 unnumbered pages.
English Translation of Examiner Office Letter for Japanese Patent Application U.S. Appl. No. 2005-317886, mailed Oct. 16, 2012, consists of 5 unnumbered pages.
Watanabe, N., et al., "Method of Constructing a Backbone Architecture of Next-Generation Computer Network," NTT R&D, Apr. 10, 1998, pp. 435-444, vol. 47, No. 4, Telecommunication Association.
English Translation of Examiner's Refusal Decision for Japanese Patent Application Serial No. 2005-317886, mailed Aug. 10, 2011, pp. 1-2.
English Translation of Chinese Office Action for Chinese Patent Application U.S. Appl. No. 200510118798.0, dated Apr. 6, 2011, consists of 4 pages.
English Translation of Examiner's Office Letter for Japanese Patent Application Serial No. 2005-318066, dated Nov. 22, 2010, pp. 1-4.
"Draft Exploration Party," Computer & Network LAN, May 1, 2003, pp. 75-78, vol. 21, No. 5, Ohm Publisher.
Tal Lavian et al. "Intelligent network services through active flow manipulation" Intelligent Network Workshop, 2001 IEEE May 6-9, 2001, Piscataway, NJ, USA, IEEE, May 6, 2001, pp. 73-82.
Ansari et al., "Element Bindings and Topology discovery Protocol—(Slides)", May 20, 2009.
Lin et al., "Multihop Wireless IEEE 802.11 LANs". 1999 IEEE Int. Conf., vol. 3, pp. 1568-1572, Jun. 1999.
Ram Gopal, "Separation of Control and Forwarding Plane Inside a Network Element", 2002 IEEE.
Furquan Ansari et al., "ForCES Element Bindings and Topology Discovery Protocol", Jul. 2004.
V.Chan et al., "Control Plane Platform Development Kit," Intel Developer Forum, Spring 2003.

\* cited by examiner

TRADITIONAL ROUTER-BASED NETWORK

SOFTROUTER PROTOCOL FAILOVERS

CROSS-REFERENCES

The present application claims the benefit of provisional application No. 60/623,885, entitled "SoftRouter: Router Disaggregation," filed Nov. 1, 2004. In addition, the present application is related to copending application Ser. No. 11/147,642, entitled "SoftRouter," Ser. No. 11/147,472, entitled "SoftRouter Protocol Disaggregation," Ser. No. 11/147,937, entitled "SoftRouter Separate Control Network," Ser. No. 11/147,768, entitled "SoftRouter Feature Server," Ser. No. 11/147,491, entitled "SoftRouter Dynamic Binding Protocol," which were filed on the same date as the present application, Jun. 8, 2005. The provisional and related applications are incorporated herein by reference in their entireties.

FIELD OF THE INVENTION

The present invention relates generally to the field of networking and, in particular, relates to protocol failovers in an exemplary SoftRouter architecture.

BACKGROUND OF THE INVENTION

Traditional router architectures are becoming increasingly complex today as more and more features are being added to the Internet control plane. Many operational tasks such as routing policy enforcement or traffic engineering require network-wide control that is difficult and cumbersome to achieve in a network of autonomous and complex routers. Moreover, current routers have the route controllers tightly coupled with the forwarding engine and this static binding often results in shared failures.

Despite the end-to-end architecture design principle that aims at a simple core network, as new features are being standardized, more and more control plane complexity is being added at the routers. These features include routing (e.g., BGP-based MPLS-VPNs), traffic engineering (TE) (e.g., open shortest path first (OSPF)-TE), security, and the like. In contrast, the forwarding path implementation has progressively become easier with rapid advances in large-scale hardware integration (e.g., ASIC) and ready availability of off-the-shelf chips.

Traditional IP networks are constructed using routers that operate relatively autonomously. The potentially unmanageable complexity is present at many points all over the network. This has many undesirable consequences. First, the multiple points of control significantly increase operational complexity (e.g., misconfiguration). Second, in certain circumstances, uncoordinated actions of these autonomous routers can lead to sub-optimal performance (e.g., poor recovery time) at best and network instability in the worst case. Finally, the introduction of new features may require upgrades to a large number of routers, which is both complex and error-prone.

Traditional router architectures have integrated control and forwarding. The control processors implementing control plane functions are co-located with the line cards that implement forwarding functions and often share the same router backplane. The control processors provide control functions only to the co-located line cards, and vice-versa, leading to a scenario where the line cards cannot be managed when there is a failure of the co-located controller(s).

SUMMARY

Various deficiencies of the prior art are addressed by the present invention of protocol failovers for an exemplary SoftRouter architecture, which includes many embodiments.

One embodiment is a method of performing protocol failovers, where a forwarding element (FE) runs a protocol overlay process for a particular protocol and a routing table manager (RTM) process. The FE receives routing protocol messages from an active-protocol-control element (CE) and, in response, propagates them to all protocol-CEs. Heartbeat messages are piggybacked on the received routing protocol messages. The FE receives acknowledgements from the active-protocol-CE in response to sent messages. The FE initiates failover to a backup-protocol-CE, upon failure of the active-protocol-CE.

Another embodiment is a method of performing protocol failovers, where each control element (CE) runs a protocol overlay process for a particular protocol. The CEs include an active-protocol-CE and a backup-protocol-CE. The active-protocol-CE runs a protocol process on behalf of a forwarding element (FE) that is controlled by the active-protocol-CE. The active-protocol-CE sends checkpoints periodically. The checkpoints are propagated by the FE to the backup-protocol-CE. The checkpoints are for updating a protocol state upon recovery from failure. The backup-protocol-CE participates in a protocol failover initiated by the FE.

Another embodiment is a method of performing protocol failovers, where a forwarding element (FE) sends incoming and outgoing protocol messages to all control elements (CEs). The FE is one of a number of FEs in a data plane. The CEs are in a control plane that is physically and logically separate from the data plane. The CEs and FEs communicate via a standard protocol. Each FE is dynamically bound to one of the CEs. The active-protocol-CE and the backup-protocol-CEs are synchronized for messages newer than a latest checkpoint. The FE initiates a protocol failover from the active-protocol-CE to one of the backup-protocol-CEs, which confirms it is now the active-protocol-CE. Another aspect is a storage medium storing a computer program product having instructions for performing this method.

Another embodiment is a network architecture, including a data plane, a control plane, and a protocol failover mechanism. The data plane includes a number of forwarding elements (FEs) for packet forwarding. The control plane is physically and logically separate from the data plane. The control plane includes at least one control element (CEs) for configuring, controlling, and providing routing information to the FEs via a standard protocol. There is a dynamic binding protocol for binding FEs and CEs. The protocol failover mechanism handles failovers initiated by FEs to transfer control from one CE to another CE for each routing protocol.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, many open systems interconnection (OSI) layers, gateway protocols, serial line protocols, protocol stack routing and bridging protocols, many other protocols, traffic management, optical, edge/core routing, wireless, cable, data centers, auxiliary signal path (ASP), fault management, configuration management, accounting management, performance management, security management, other network management, enterprise, government, military applications, and many other different kinds of networking characteristics and applications.

Figure 1:
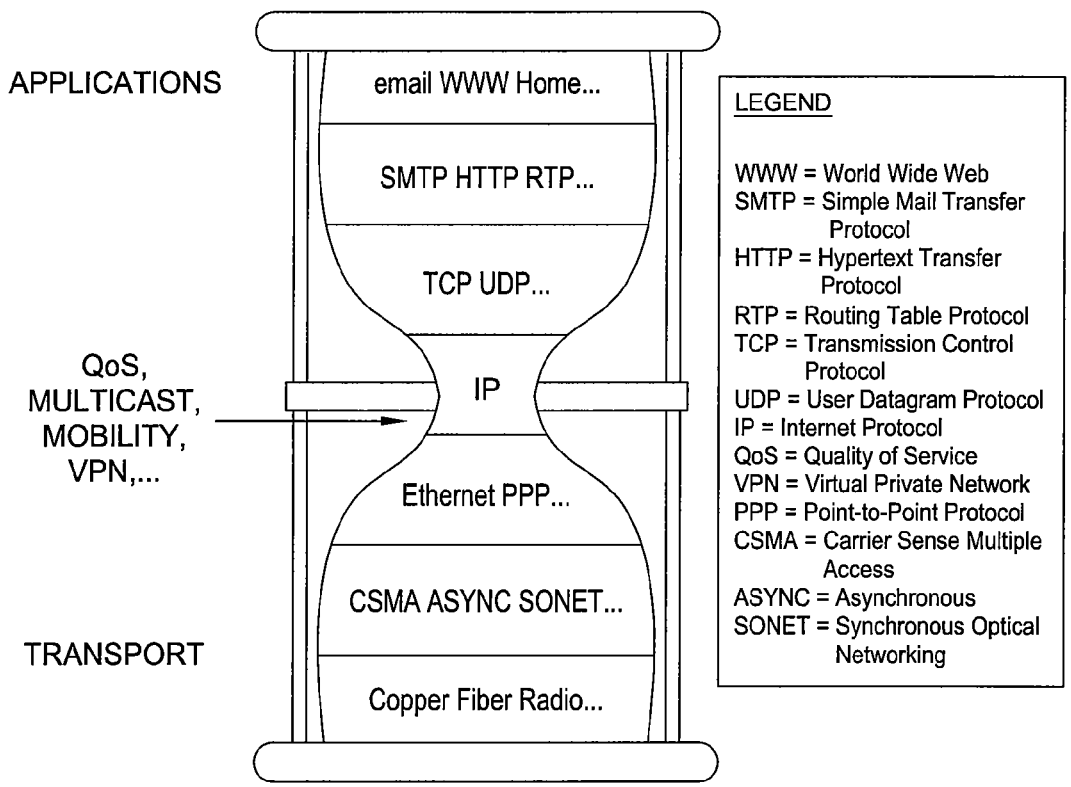
FIG. 1 illustrates the problem of emerging applications driving more functions to IP.

Internet protocol (IP) provides end-to-end datagram delivery service to protocols and applications and can use any link-layer technology that delivers packets. FIG. 1 illustrates the problem of emerging applications driving more functions to IP, expanding the middle of the hour glass. These emerging applications include email, www phone, simple mail transfer protocol (SMTP), hypertext transfer protocol (HTTP), routing table protocol (RTP), transmission control protocol (TCP), user datagram protocol (UDP), and other protocols, which involve quality of service (QoS), multicast, mobility, virtual private network (VPN), and other features and are transported using Ethernet, point-to-point protocol (PPP), carrier sense multiple access (CSMA), ASYNC (a subset of teletypewriter (TTY)), synchronous optical network (SONET), and other protocols over copper, fibber, radio, and other physical transport means. Traditional router architectures try to incorporate all of the new IP functions into routers, resulting in duplication of complex functions in multiple routers of a network. This also increases capital and operational expenses. In general, there is a need to reduce the complexity and expense of operating a network of routers.

Many new features are being added to routers, e.g. border gateway protocol (BGP), multiprotocol label switching (MPLS)-based VPNs, and traffic engineering (TE). Traditional router architectures have five to ten million lines of code and complexity is spread throughout the network. Achieving an operator's network-wide objectives, such as traffic engineering requires complex translation of global objectives to configuration information in numerous individual routers. Misconfiguration or uncoordinated configuration can result in poor performance or network instability.

The enormous success of the Internet has led to constant development and deployment of new features and services that have increasingly placed its technical foundations under stress. This has given credence to the notion that re-architecting the current distribution of functions in an IP network would lead to significant benefits in network stability, simplification of network operations, and flexibility in introduction of new network protocols and services.

Many advanced network management tasks, such as routing policy enforcement and traffic engineering would benefit significantly from the availability of a network-wide view. For instance, several common BGP-induced network stability and operations problems would be solved by moving BGP from individual routers to a single entity with autonomous system (AS)-wide scope. Similarly, many management functions require a network-wide view, without which a network can exhibit oscillation and poor stability. However, network-wide control is difficult and cumbersome to achieve in today's network of autonomous and complex routers.

In the traditional router architectures, the underlying theme is the deep intertwining of control and forwarding functions in current routers. There is a need to deconstruct routers to keep most of the network entities as dumb as possible by reducing their function to support only a few canonical packet forwarding functions and migrate all control protocols and non-forwarding related state and control processing to a few smart network-based control entities with the primary function of network-wide control. There is also a need for protocol failovers to be handled gracefully and seamlessly.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An embodiment of an exemplary SoftRouter architecture deconstructs routers by separating the implementation of control plane functions from packet forwarding functions. Other embodiments of network architectures that achieve this deconstruction are also within the scope of this invention. The present invention encompasses the concept of this deconstruction and its implications for network architecture. In the exemplary SoftRouter architecture, all control plane functions are implemented on separate control entities that are not required to be co-located with the forwarding engines. By migrating all non-forwarding related state and control processing to a few network-based control entities, simpler implementation of network-wide objectives are possible, because coordinated configuration changes are required at only a few smart network elements, instead of all the network elements in an AS. In addition, the association between controllers and the forwarding engines is dynamic, allowing flexible control of a forwarding engine by any control entity that is capable of doing so.

The exemplary SoftRouter architecture includes a dynamic binding protocol for establishing and maintaining dynamic bindings between forwarding entities and the control entities in the network. Intra-domain and inter-domain routing is adapted in the exemplary SoftRouter architecture with improved performance, including improved performance for the intra-domain protocol OSPF.

Disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An exemplary embodiment of an exemplary SoftRouter architecture is an approach to disaggregating the complex IP functions demanded by emerging applications. SoftRouter centralizes and allows sharing of complexity. SoftRouter enables scalable introduction of new functions without unduly encumbering IP forwarding functions.

Figure 2:
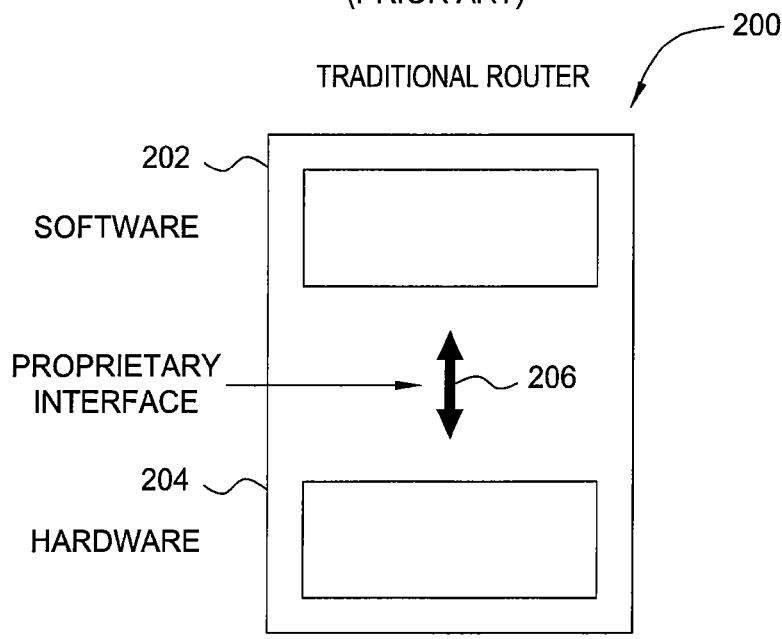
FIG. 2 is a block diagram showing a traditional router.

FIG. 2 shows a traditional router 200 having integrated control and transport planes. The traditional router 200 has software 202 and hardware 204 communicating through a proprietary interface 206.

Figure 3:
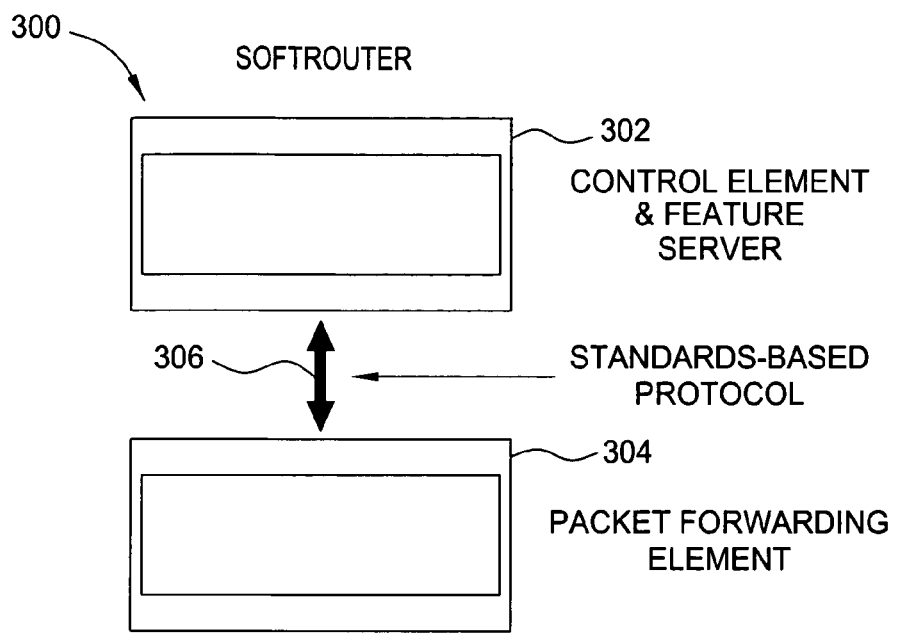
FIG. 3 is a block diagram showing a high level abstraction of an exemplary SoftRouter architecture.

By contrast, FIG. 3 shows a high level abstraction of an exemplary SoftRouter architecture 300 that disaggregates the control and transport planes in separate hardware that communicate using standard protocols. The SoftRouter architecture 300 has a control element and features server component 302 and a packet forwarding element component 304 that communicate using a standards-based protocol 306.

Figure 4:
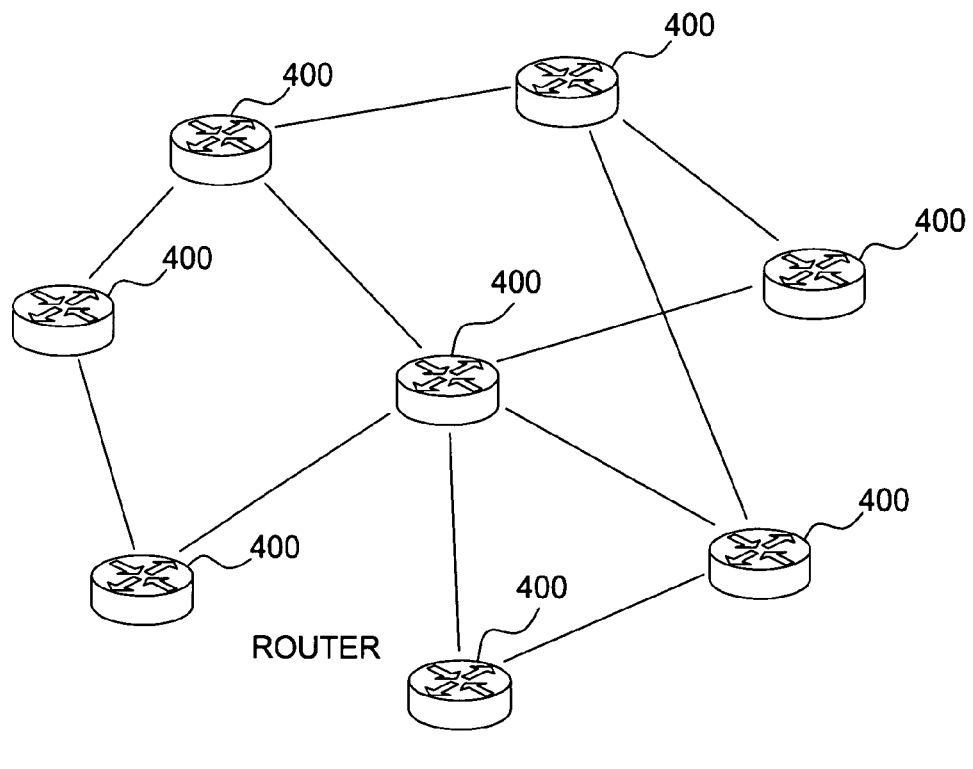
FIG. 4 is a block diagram showing a traditional router architecture.

FIG. 4 shows the traditional router architecture, which has a number of interconnected routers 400.

Figure 5:
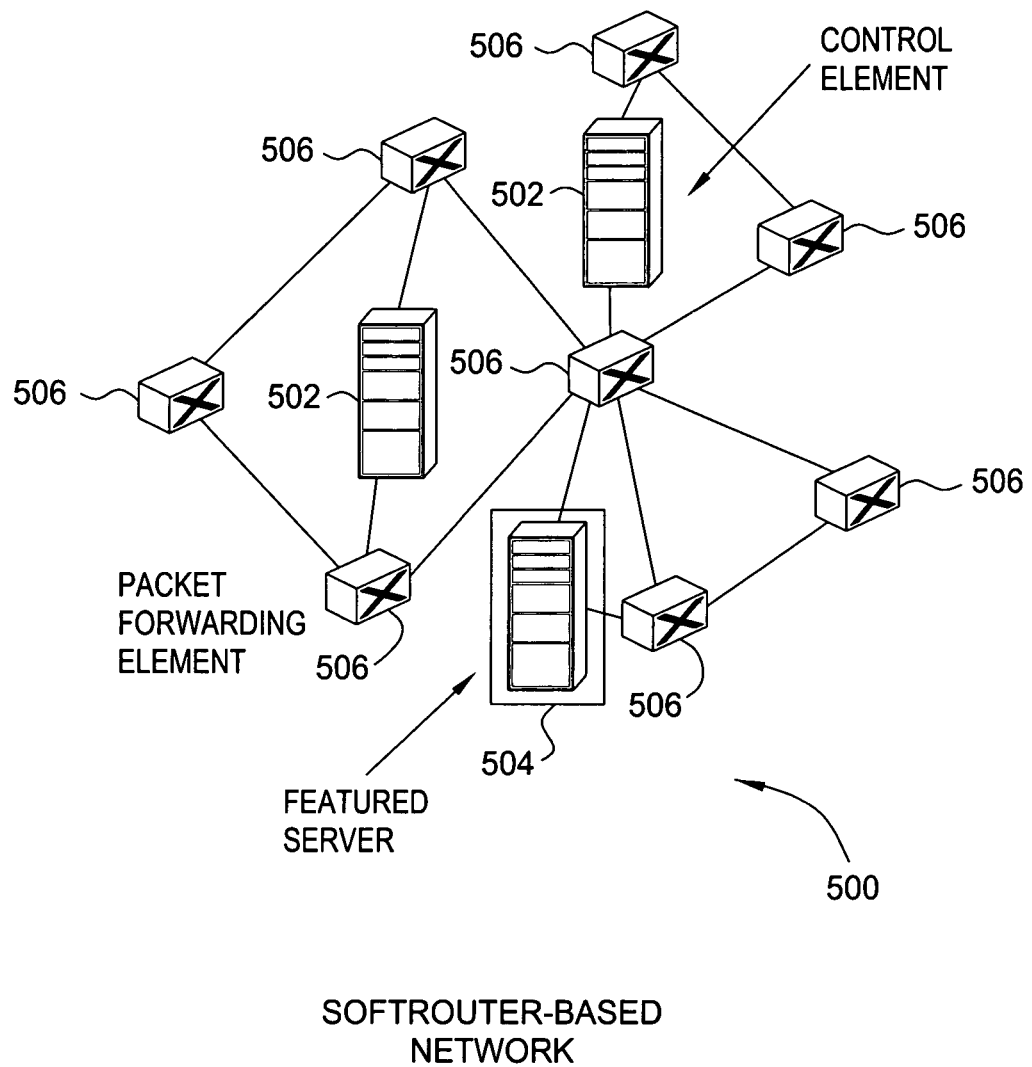
FIG. 5 is a block diagram showing an embodiment of the exemplary SoftRouter architecture.

FIG. 5 shows an embodiment of the exemplary SoftRouter architecture 500. In this embodiment of the exemplary SoftRouter architecture 500, the software servers include control elements (CEs) 502 and feature servers (FSs) 504. CEs 502 are responsible for traditional routing, e.g., for both interior gateway protocol (IGP) (e.g., OSPF) and exterior gateway protocol (EGP) (e.g., border gateway protocol (BGP)). FSs 504 are responsible for value-added functions and network-based applications, e.g., QoS, VPN, and mobile IP. Both CEs 502 and FSs 504 interface to forwarding elements (FEs) 506. CEs 502 and FSs 504 may have additional interfaces to each other. The exemplary SoftRouter architecture separates and centralizes the software-based route controller (SoftRouter) from hardware-based transport and packet forwarding.

Deconstructing routers in the exemplary SoftRouter architecture separates the control and forwarding functions. This separation is more than logical (e.g., the use of a well-defined interface with a modular application programming interface (API)); in fact, the control is physically separated (i.e., executed in a distinct network element) by multiple hops from where the forwarding is performed.

A FE 506 is a network element that performs the actual forwarding and switching of traffic. In construction, a FE 506 is similar to a traditional router in that it may have multiple line cards, each in turn terminating multiple ports, and a switch fabric for shuttling data traffic from one line card to another. However, a FE 506 is different from a traditional router, because there is an absence of any sophisticated control logic (e.g., a routing process like OSPF or BGP) running locally. Instead, the control logic is hosted remotely.

A CE 502 is a general purpose computing element, such as a server. It connects to the network like an end host, except that it is typically multi-homed to the network via multiple FEs 506, so that it is not disconnected from the network when a single link fails. A CE 502 runs the control logic on behalf of FEs 506 and, hence, controls them. Any control logic typically found on a traditional router can be migrated to the CEs 502, including routing protocols like OSPF and BGP as well as protocols such as resource reservation protocol (RSVP), label distribution protocol (LDP), Mobile IP, and the like.

A FE 506 functions to forward data traffic between its links. This function may take various forms, such as packet forwarding, label switching, and optical switching, among others. Packet forwarding includes both layer 2 (medium access control (MAC)-based switching) and layer 3 (longest-prefix match) forwarding. Label switching includes, for example, MPLS forwarding. The data-path forwarding functions can include label-swapping, pushing, and popping. In optical switching, the traffic can be time-switched, wavelength-switched, or space-switched among the links. In each of these cases, the switching function is driven by a simple local table that is computed and installed by a CE 502 in the network. Thus, the ability of a FE 506 to do its work based only on a local data structure means the FE 506 is designed to be dumb and fast, while the more complex logic is relegated to a remote, yet smart CE 502.

Both FEs 506 and CEs 502 are understood as logical entities, in addition to physical network elements. Specifically, a FE 506 is logically defined as a collection of ports where traffic can be switched among one another. For example, a FE 506 may include all ports on a single line card, in which case the whole physical packet switch is made up of multiple logical FEs 506. A FE 506 can also span more than one physical switch; however a CE can control multiple FEs 506. Similarly, a CE 502 can be understood as a logical process instantiated for providing control on behalf of FEs 506 and can be distinguished from the server machine that actually executes it. In particular, a physical CE server machine (PCE) can host multiple CE 502 processes, each serving a different collection of FEs 506. Vice-versa, it is also possible for multiple CE 502 processes (each instantiated for a different control purpose such as interior gateway protocol (IGP) and exterior gateway protocol (EGP)) serving the same FE 506 to be hosted on distinct PCEs. The physical and logical definitions of FEs 506 and CEs 502 are used interchangeably.

Figure 6:
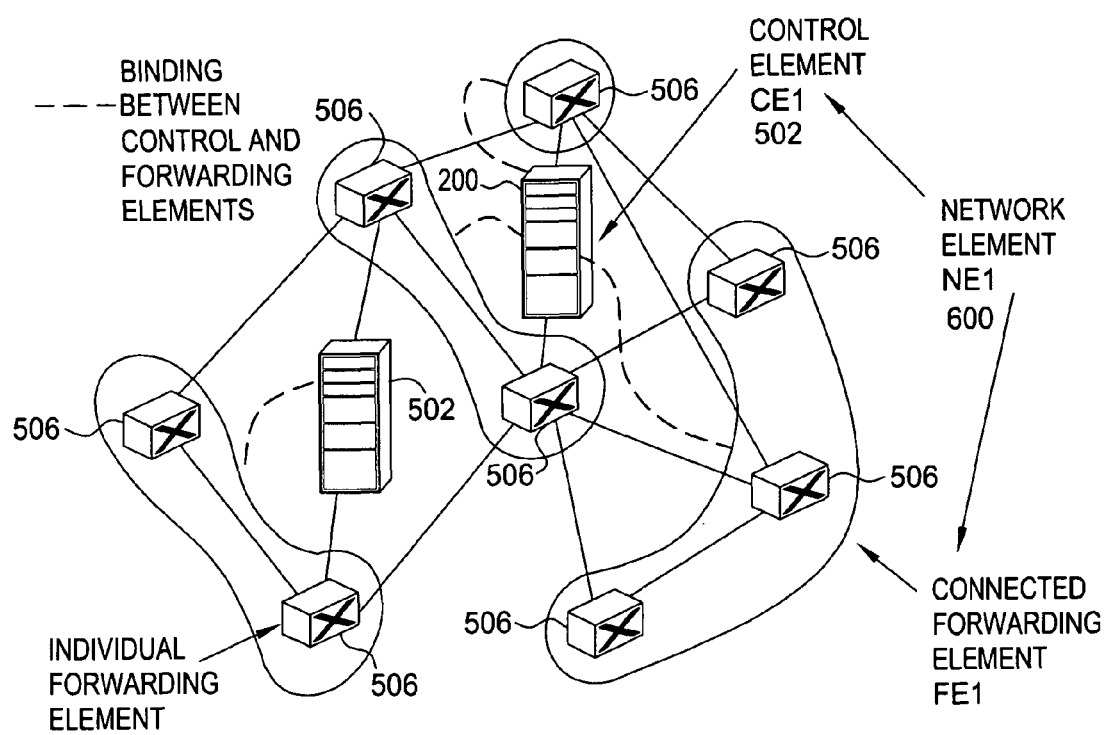
FIG. 6 is a block diagram showing an embodiment of the exemplary SoftRouter architecture illustrating network elements.

FIG. 6 shows an embodiment of the exemplary SoftRouter architecture illustrating network elements 600. Although the notion of a router is not strictly needed in the exemplary SoftRouter architecture, it is useful to regain some equivalent notion in order to understand the routing view of a network. To this end, the concept of a network element (NE) 600 is defined at a high level as a logical grouping of FEs 506 and the respective CEs 502 that control those FEs 506. A particular NE 600 grouping implicitly classifies each link between FEs 506 as either internal (or intra-NE) or external (or inter-NE). An internal link connects two ports belonging to the same NE 600 and an external link connects two ports belonging to different NEs 600. The concept of NE 600 is useful when intra-NE and inter-NE routing follow different approaches.

Without additional restrictions, the above definition of NE 600 allows flexibility. For example, this definition allows two FEs 506 in disjoint parts of a network to belong to the same NE 600. It also allows for a traditional router model where the FE 506 includes exactly all the ports in the physical element and the controlling CE(s) 502 are collocated on the same element.

In clustered routing, the FEs 506 making up a NE 600 are part of a contiguous cloud. In other words, all ports of the NE 600 are reachable from each other via links internal to the NE 600. Physically, this represents the clustering of neighboring physical FEs 506 into a single NE 600. A typical scenario is that of several routers being connected back-to-back in a central office. From a routing perspective, this clustering-based definition of the NE 600 can provide significant simplification. The reduced number of NEs 600 in the routing view reduces the inter-NE routing complexity and a different, possibly less complex routing protocol can be employed for intra-NE routing.

The control relationship between a FE 506 and a CE 502 is formally called a binding. More precisely, a binding between a FE 506 and a CE 502 means that the CE 502 is performing particular control functions on behalf of the FE 506. Because multiple protocols (e.g., IGP and EGP, or even multiple instances of a protocol) may be required for the operation of a FE 506, a FE 506 may have multiple CE 502 bindings.

The exemplary SoftRouter architecture includes various protocols. A number of different protocols are used for the operation of a network designed according to the exemplary SoftRouter architecture, including dynamic binding protocol and FE/CE transport protocol. The binding between a FE 506 and a CE 502 is established via a protocol that discovers CEs 502 and FEs 506 and also maintains these bindings in the face of network disruptions. In the most general case of the dynamic binding protocol, a FE 506 can bind to any available CE 502 and a CE 502 can perform control functions for any FE 506, thus yielding maximal resiliency and minimal configuration overhead. This dynamic binding ability is a feature of the concept of deconstructed routers that have separate control and forwarding functions. The FE/CE transport protocol has two parts, namely data and control. For the data part, the FE/CE transport protocol supports tunneling of routing protocol packets between FEs 506 and CEs 502 so that a routing protocol packet received by a FE 506 can be sent to a CE 502 for processing. For the control part, once a binding is established, the FEs 506 and the CEs 502 use the FE/CE transport protocol to communicate state information and perform control. On the uplink (FE 506 to CE 502) direction, this control part provides link and forwarding state information (e.g., link up/down signal) to the CE 502. On the downlink direction, the FE/CE transport protocol carries configuration and control information (e.g., enable/disable a link, forwarding information base (FIB)). Known protocols, such as forwarding and control element separation (ForCES) may be used for the FE/CE transport protocol.

The dynamic binding feature of the exemplary SoftRouter architecture allows for a FE 506 to be separated by multiple hops from a CE 502. This flexibility comes at the expense of increased complexity in the initial configuration of the forwarding elements. In the SoftRouter model, upon bootup, the FE 506 obtains its configuration information, including the IP addresses of its interfaces from a remote CE 502 that resides on a server. This poses a potential paradox: in order to discover a CE 502 and send packets to it, the FE 506 requires routing information; however, the routing information is supposed to come from the CE 502. This paradox is resolved using a discovery protocol (e.g., Bell Labs discovery protocol (BLDP)) that is part of the exemplary SoftRouter architecture. This discovery protocol lets FEs 506 and CEs 502 discover each other and maintain a routable path between these entities. The dynamic binding process also supports enhanced features, such as CE 502 load balancing, constrained clustering algorithms that improve CE-FE binding resiliency and failover, increasing the availability for the network. These features also enable better network planning and better network-wide control.

Embodiments of the dynamic binding protocol provide binding service for FEs 506 and routing services for FE-CE messages. The dynamic binding protocol runs continuously on all the elements (FEs 506 and CEs 502) for the lifetime of the network as a separate protocol, independent of other protocols that operate in the network. At the minimum, each FE 506 and CE 502 has a pre-configured octet string (FEID/CEID) that acts as a unique identifier. In a bridged network of FEs 506 and CEs 502 (for example, connected over Ethernet), a rapid spanning tree protocol provides the connectivity for FE-CE communication. Because such networks are not the only one possible given the heterogeneous FE 506 possibilities, the dynamic binding protocol includes a separate component for supporting routing services between the CEs 502 and the FEs 506. However, if a spanning tree protocol is available, the dynamic binding protocol can make use of it for routing services. The dynamic binding protocol has four components: discovery, association, failure detection with repair, and transport tunnels.

The discovery component of the dynamic binding protocol enables a FE 506 to discover a CE 502 that can manage it. This CE 502 is called the managing-CE for that FE 506. In order for the discovery component to provide rapid convergence for the configuration process, CE 502 information is distributed all over the network, enabling FEs 506 to dynamically bind to the best CE 502 using bindings that are either pre-configured by the network administrator or obtained using distributed clustering algorithms.

A source-routed routing layer helps in the discovery process. At the time of bootup, each FE 506 uses a randomly chosen temporary IP address along with the FEID to perform pre-discovery routing. This address is chosen from a controlled address space, for example a private subnet address. The CEs 502 are pre-configured and, hence, have a valid IP address. All messages are broadcast on all interfaces of the FE 506 and the CE 502.

FEs 506 and CEs 502 discover each other by advertising their presence to their immediate neighbors by periodic broadcasts. Each node (FE/CE) thus maintains a list of neighbors in a local table. FEs 506 also periodically solicit CE 502 information from all neighbors in order to collect up-to-date information on the CEs 502 in the network. In response, neighboring FEs/CEs respond with a list of CEs 502 that are known to them. Each CE 502 in the list is also associated with a known source-route to the CE 502 from the neighboring FE/CE. By associating each entry with a time-to-live parameter, it is ensured that CE 502 information is periodically refreshed with the best path to reach the CE 502. Each node uses the source-route with the shortest hop-count to contact a CE 502. The discovery process runs all the time in a network designed according to the exemplary SoftRouter architecture.

Each FE 506 is assigned one primary-CE and at least one backup-CE by the network administrator during planning. This information is configured in the CEs 502 and, optionally, in the FEs 506. Typically, this assignment is made a priori by taking into account factors, such as the load on the CE 502, the distance between the CE 502 and the FE 506, and the reliability of the links between them. Thus, when a CE 502 is contacted by a FE 506, the CE 502 lets the FE 506 know the identity of its primary-CE and backup-CE, if this information is available, or accepts the FE 506 if it can manage it. If not accepted, the FE 506 then proceeds to contact its primary-CE or backup-CE.

The association process strives to establish and maintain an active association between a FE 506 and its primary-CE and backup-CE. The managing-CE is chosen by the FE 506 from the list of actively associated CEs 502, with the primary-CE preferred at all times to other CEs 502.

The dynamic binding protocol has mechanisms to detect and repair association failures. Once an association is made between the FE 506 and a CE 502, the liveness of the association is probed periodically through heartbeat messages initiated by the FE 506. When heartbeat messages do not elicit any responses from the CE 502, it implies that either the path to the CE 502 is no longer valid or that the CE 502 node is no longer alive. A CE 502 cannot disassociate from a CE 502 without acknowledgement from the FE 506 accepting the change. This is also true for a FE 506 desiring a change in managing-CE.

There is an exemplary method of protocol failover for embodiments of the exemplary SoftRouter architecture. This protocol failover is based on reliable message passing. In this exemplary method of protocol failover, there is a list of CEs 502 for each protocol. This list is maintained on a per-protocol basis. Some examples of protocols include OSPF, IS-IS, enhanced interior gateway routing protocol (EIGRP), routing information protocol (RIP), and other routing protocols. In other embodiments, the lists are identical across protocols. Only one CE is actively managing the FE 506 at any time. This CE is called the active-protocol-CE, e.g., active-OSPF-CE. Other CEs 502 are called backup-protocol-CEs. All protocol-CEs run the protocol instance on behalf of a FE 506. The FE 506 reliably sends incoming protocol messages to all the CEs 502. Periodic checkpoints are generated by the active-protocol-CE. Checkpoints are reliably propagated by the FE 506 to all backup-CEs. Checkpoints are useful for updating the protocol state upon recovery from failure. Upon recovery of a protocol-CE, synchronization is performed by the active-protocol-CE. Protocol failure is initiated by the FE 506.

Figure 7:
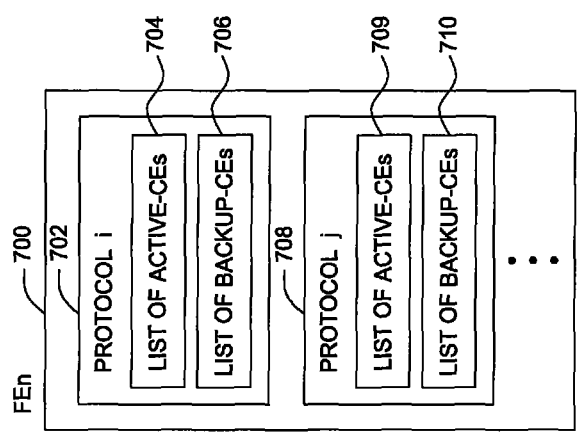
FIG. 7 is a block diagram showing exemplary lists of active-control elements (CEs) and backup-CEs for a forwarding element (FE)

FIG. 7 shows exemplary lists of active-protocol-CEs and backup-CEs for an arbitrary FE 506, FE n 700. For one protocol, protocol i 702, FE n 700 has a list of active-protocol-CEs 704 and a list of backup-CEs 706. For another protocol, protocol j 708, FE n 700 also has a list of active-protocol-CEs 709 and a list of backup-CEs 710. FE n 700 may have lists for other protocols as well. In general, the lists of active-protocol-CEs 704, 709 and backup-CEs 706, 710 are maintained on a per-protocol basis. Each FE 506 is assigned a primary-CE and a list of secondary-CEs, when it is configured. The CE 502 that is managing the FE 506 at any particular time is called the active-protocol-CE. All other working CEs 502 in the set of primary-CEs and secondary-CEs are called backup-CEs.

Figure 8:
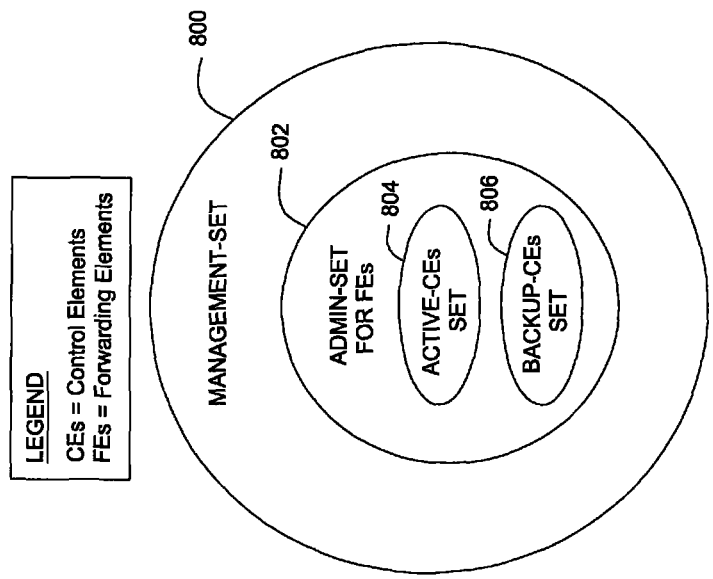
FIG. 8 is a Venn diagram showing an exemplary hierarchy of sets.

FIG. 8 shows an exemplary hierarchy of sets. A management-set 800 is a set of all the CEs 502 in a network. The management-set 800 also includes an admin-set 802 for each particular protocol. The admin-set 802 includes an active-protocol-CEs set 804 and a backup-CEs set 806 for a particular protocol. The management-set 800 includes a primary-CE 804 (set of one) and the set of secondary-CEs 806 for a particular FE 506. The protocol-specific active-protocol-CE and the set of backup-CEs is called the admin-set 802 of a given protocol for the particular FE 506 and the admin-set 802 is a subset of the management-set 800. The admin-set 802 is protocol-specific and configurable. For example, OSPF can have a different admin set 802 than BGP at a particular FE 506. A discovery protocol tries to establish a heartbeat between a FE 506 and all CEs 502 in the management-set 800. If a heartbeat exists and if a particular protocol messages are acknowledged by a CE 502, then that CE 502 moves into the admin-set 802 for that protocol.

In this exemplary method of protocol failover, a discovery protocol establishes basic heartbeat between a FE 506 and all protocol-CEs. The heartbeat existence implies that there is a valid communication path between a FE 506 and CE 502. Heartbeat failure implies there is a failure of the communication path. This exemplary method of protocol failure applies to protocols that operate on a message basis (e.g., OSPF, IS-IS, RIP, EIGRP) rather than a stream basis (e.g., BGP). Other embodiments may be adapted to handle protocols that operate on a stream basis. All routing protocol messages intended for a FE 506 from its peers go through that FE 506 to the protocol-CEs. Other routes to the protocol-CEs are not used, because the destination address is that of the FE 506. The routing table manager (RTM) process is similar to the protocol process. The RTM process updates the FIBs on the FE 506. Inputs to the RTM process are routing table entry (RTE) outputs from the various protocol processes, e.g., ISPF, BGP. All messages from FE 506 to protocol-CEs and vice-versa carry sequence numbers for ordering of messages.

In this exemplary method of protocol failover, there are three types of messages seen at an FE 506: incoming routing protocol messages, outgoing routing protocol messages, and maintenance messages. Incoming routing protocol messages are from other FEs 506 or from CEs 502 on behalf of other FEs 506. Outgoing routing protocol messages are from an active-protocol-CE to other FEs 506. Maintenance messages include heartbeats, failovers, checkpoints, and re-sync. Incoming routing protocol messages are sent by the FE 506 to all protocol-CEs. Messages are sent reliably, for example, using stream control transmission protocol (SCTP) or transmission control protocol (TCP). Each routing message has a message number given by the FE 506. Messages are acknowledged by all protocol-CEs. A heartbeat message is piggybacked on all communication between a FE 506 and CEs 502, and includes the active protocol-CEID. Heartbeats are protocol-specific. This is different than the discovery protocol heartbeat, which is used to detect generic CE 502 node failure.

Figure 9:
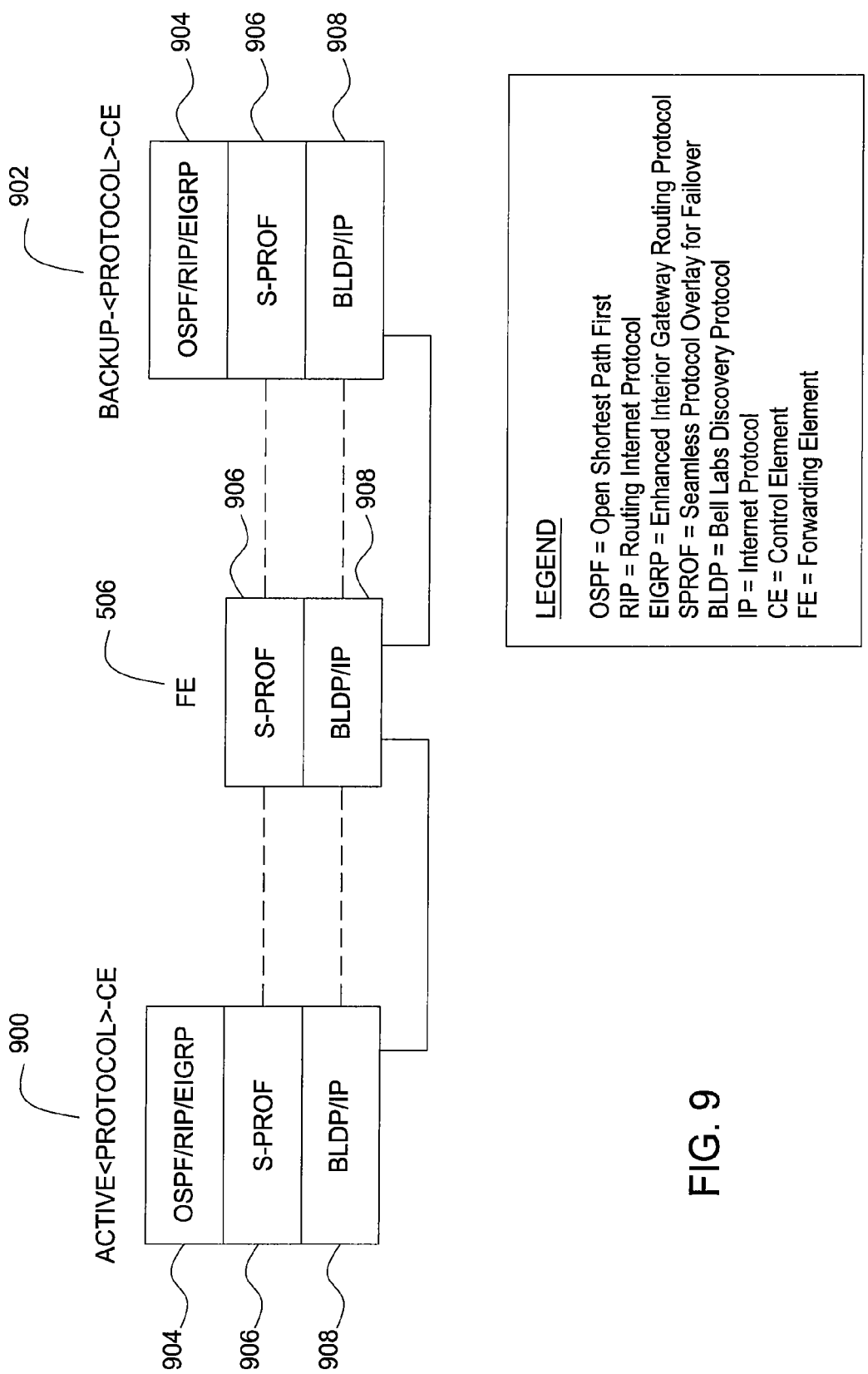
FIG. 9 is a block diagram showing an exemplary protocol overlay for failover.

FIG. 9 shows an exemplary protocol overlay for failover. This exemplary method of protocol failover includes a protocol overlay called seamless protocol overlay for failover (S-PROF) for enabling failover. All CEs 502 run a routing protocol process 904 and an S-PROF process 906 as well as a discovery protocol/IP process 908. This includes active-protocol-CE 900 and backup-protocol-CEs 902. The S-PROF process 906 handles reliability and failover maintenance issues. Routing protocol processes 904 are agnostic with respect to the failover/S-PROF process. All CEs 502 receive a copy of every incoming protocol message. A FE 506 can multicast them or adopt a copy-and-unicast approach. All routing protocol messages are acknowledged (SCTP/TCP). Incoming routing protocol messages are stored by the S-PROF overlay process. An S-PROF header encapsulates all the routing messages, including both incoming and outgoing routing messages. S-PROF encapsulates outgoing (from CE 502) routing protocol messages when the CE 502 is an active-protocol-CE 900. Outgoing messages from a backup-protocol-CE 902 are dropped at the S-PROF process 906 and an empty S-PROF packet is sent to the FE 506. The S-PROF process at the FE 506 receives routing protocol messages only from the active-protocol-CE 900. A protocol heartbeat is part of every S-PROF message.

An exemplary message format for S-PROF messages sent from a FE 506 to a CE 502 include the following fields: source FEID, destination CEID, routing protocol identifier, S-PROF sequence number of the message (from the SCTP connection), checkpoint message identifier, CEID of active-protocol-CE, and protocol message enclosed, if any.

An exemplary message format for S-PROF messages sent from a CE 502 to a FE 506 include the following fields: source CEID, destination FEID, routing protocol identifier, S-PROF sequence number of protocol message that is acknowledged, checkpoint message identifier, CE 502 state identifier (e.g., active, backup, re-sync), protocol-message (if any and only if the source CE 502 is the active-protocol-CE), and forwarding flags. Forwarding flags indicate to whom an output routing-protocol message should be forwarded to. To distinguish between messages sent out to other routing peers, other protocol-CEs, and other protocol-processes (e.g., RTM process).

In this exemplary failover process, inputs to the routing protocol are the routing messages. Manual reconfiguration changes at one protocol-CE are communicated to other protocol-CEs. The active-protocol-CE updates a FE 506, which then updates others. There is reliable transfer to ensure inputs are consistent across all protocol-CEs. Retransmissions are initiated by a FE 506 based on S-PROF sequence number. If a retransmission is not acknowledged by a protocol-CE after a predetermined number of retries, the CE 502 is dropped from the backup-CE list. Routing-protocol process failure is detectable. A S-PROF message is sent by a CE 502 only when there is an output message from the routing-protocol process. S-PROF messages from the backup-protocol-CE are empty. Absence of S-PROF messages indicates that the routing-protocol process on the CE 502 has failed.

A FE 506 initiates failover. There are many failure possibilities, including the following three cases: (1) the active-protocol-CE goes down, (2) all communication paths between the active-protocol-CE and the FE 506 go down, and (3) a protocol process on the active-protocol-CE fails. The first two cases are identified by the protocol (e.g., BLDP) and the third case is identified by missing S-PROF messages from the CE 502. In all three cases, the FE 506 switches to one of the backups. The FE 506 selects a backup-protocol-CE and changes it to active status. Notice is provided to all protocol-CEs by the active-protocol-CEID in S-PROF messages. The S-PROF process at the backup-protocol-CE sees the change and starts to encapsulate messages from the routing protocol process without discarding it. The former active-protocol-CE knows of the change, when the protocol process starts responding once again. Even if the backup-protocol-CE sends any messages in the interim, the FE 506 ignores all routing protocol messages from the backup-protocol-CE.

When an active-protocol-CE fails, the backup-protocol-CE takes over as the active-protocol-CE. All CEs 502 are aware of changes immediately upon receipt of the next message from the FE 506. Upon failure, the recovery process proceeds as follows. The CE 502 node or CE process recovers from failure (along with the S-PROF process). Upon receiving the next protocol message from failure, the backup-protocol-CE is aware of the current active-protocol-CE and the latest checkpoint. Because messages are stored by S-PROF in non-volatile memory, some messages are recoverable. The unknown messages (based on S-PROF sequence numbers) are recovered by the reliable connection between FE 506 and CE 502 and with the help of the current active-protocol-CE. Re-sync messages either originate from the active-protocol-CE or the FE 506, according to the design choice. Until the CE 502 is synchronized, the CE 502 is in a re-sync state. After synchronization, the CE 502 switches to the backup state.

In this exemplary method of protocol failover, a checkpoint is a specific S-PROF message number. All S-PROF message numbers less than the checkpoint are irrelevant. The protocol-CE keeps a per FE 506 checkpoint. All protocol-CEs are synchronized for those S-PROF messages that are newer than the last checkpoint. The active-protocol-CE sets a checkpoint and communicates it to all the CEs 502. This is a protocol-specific checkpoint to be determined by a procedure that is configured during initialization. The FE 506 need not know about the specifics of the protocol so that it is still a generic service. Checkpoint information and the active-protocol-CEID are included in all protocol messages sent to the backup-protocol-CEs. The backup-protocol-CE requests retransmission from the active-protocol-CE for all missing messages since the last checkpoint, upon failure recovery/reboot. All communication between the active-protocol-CE and the backup-CE is via the FE 506. In some embodiments, the FE 506 stores messages for re-sync, if non-volatile storage is available. For example, OSPF has summary-LSAs sent every 30 minutes and a new checkpoint can be established every 60 minutes, reducing backup synchronization overhead.

This exemplary method of protocol failover addresses several consistency issues: CE 502 nodes/processes fail and recover fast (thrashing), different messages are lost for different CEs 502 in the backup-protocol-CE list, and performance under high load. To address thrashing, this exemplary method maintains sufficient interval before switching back to the preferred CE 502. Also, a reliable transport protocol (e.g., STCP/TCP) is used to ensure re-sync, non-volatile storage at CEs 502 is used for faster re-synchronization, and checkpoints help avoid large re-sync loads. To address message losses, a reliable transport is used. If there are heavy losses for some CEs 502, then this exemplary method switches to the re-sync state to avoid inconsistency. Removal from the backup list also ensures re-sync at a later stage. To address overload, all CEs 502 in the backup-list run protocol instances for the FE 506. Performance degradation is possible under a heavy load and is mitigated by assigning low priority to backup processes on those CEs 502.

S-PROF can be implemented as a generic service. Protocol-specific instantiations can be made as necessary. Timers may be set according to each protocol and the behavior of forwarding flags may be variable. S-PROF interacts with the RTM process. The RTM process can also fail and, hence, requires hot standby to be reliable. When the RTM process co-exists with the routing protocol process, then the FE 506 notifies the S-PROF process at that CE 502. Otherwise, S-PROF at the active-protocol-CE sets up forwarding flags that notify the FE 506 to forward RTM updates appropriately.

Figure 10:
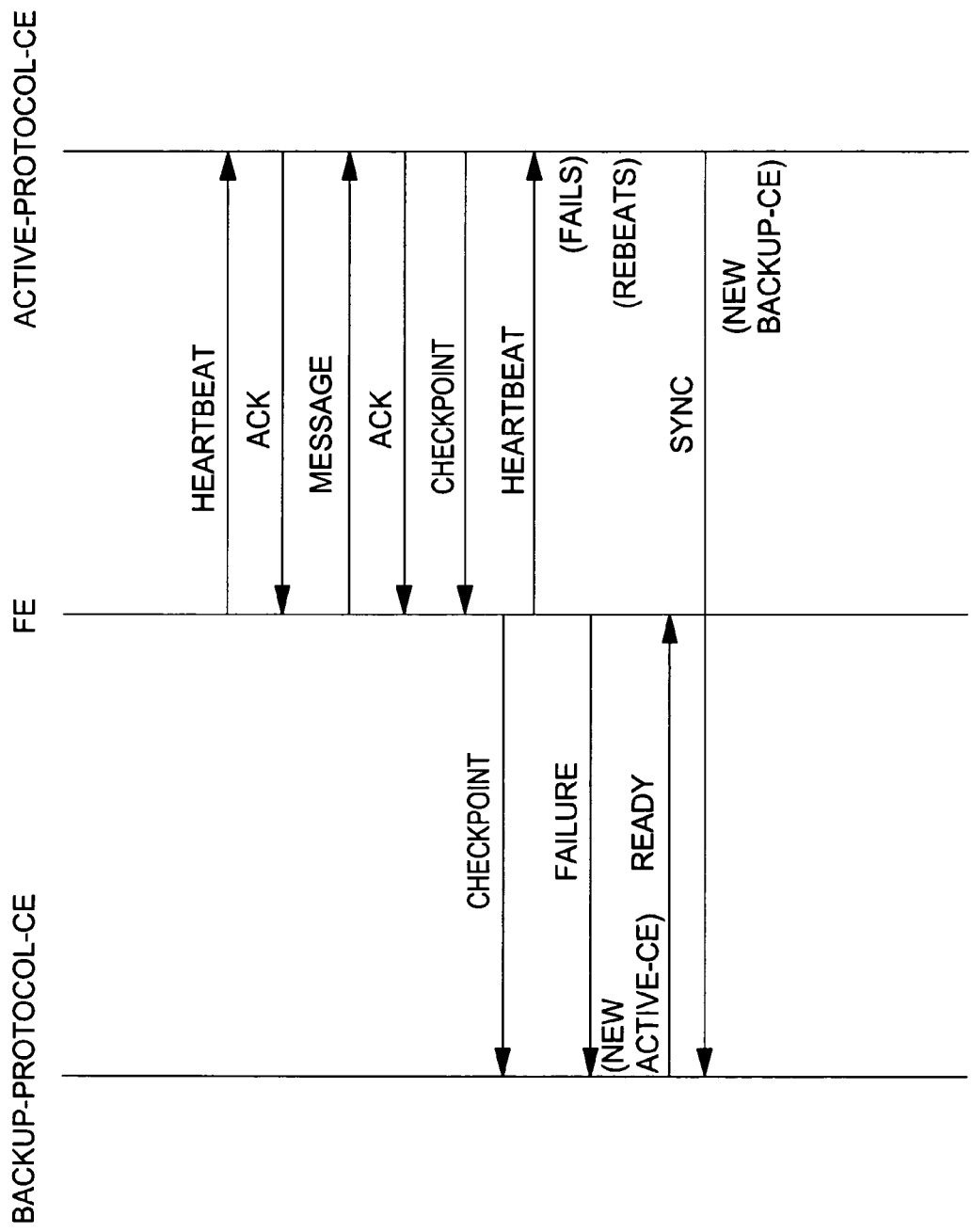
FIG. 10 is a sequence diagram showing an exemplary failover scenario.

FIG. 10 is a sequence diagram showing an exemplary failover scenario where a heartbeat exists at first, checkpoints are generated, the heartbeat fails, the backup-protocol-CE becomes the new active-protocol-CE, the failed active-protocol-CE reboots and syncs with the new active-protocol-CE to become the new backup-CE.

There is an exemplary method for a FE-initiated failover. A FE 506 exchanges protocol heartbeats (or any messages, if present) with active-protocol-CE periodically. There are three failure possibilities: the active-protocol-CE goes down, all communication paths between active-protocol-CE and the FE 506 goes down, or the protocol process on active-protocol-CE fails. If there is no response from the CE 502 (e.g., any acknowledgements or messages), then the FE 506 removes the active-protocol-CE from the admin-set and initiates failover to one of the backup-CEs in the admin-set. The backup-protocol-CE responds to the FE 506 indicating it is ready. The FE 506 sends a message to all protocol-CEs signaling failover to a backup-protocol-CE. The backup-protocol-CE responds with confirmation that it is now the active-protocol-CE.

There is an exemplary method for failover at a CE 502. The backup-protocol-CE takes over as active-protocol-CE upon failure. Given that the new active-protocol-CE has all protocol messages from the last-known checkpoint and processes protocol messages in order, the new active-protocol-CE quickly arrives at the current protocol state. The S-PROF process at the new active-protocol-CE starts encapsulating the messages to the FE 506 instead of dropping it. This current state is now used to provide the routing table manager with up-to-date information.

Figure 11:
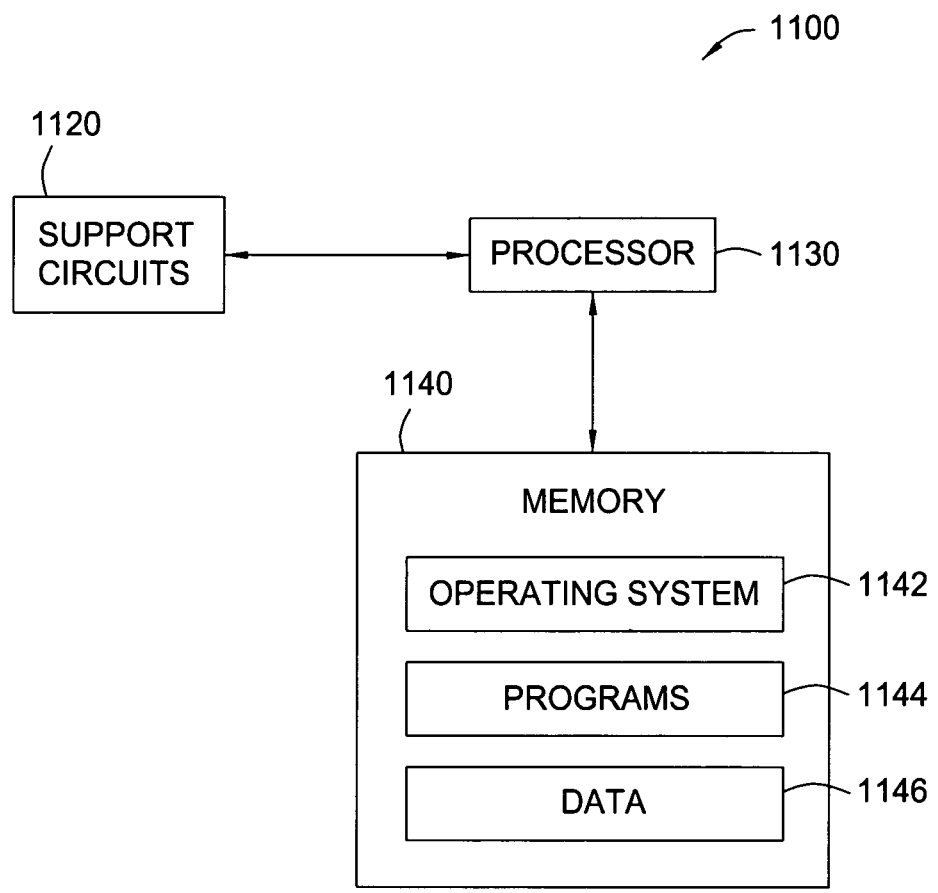
FIG. 11 is a high level block diagram showing a computer.

FIG. 11 is a high level block diagram showing a computer. The computer 1100 may be employed to implement embodiments of the present invention. The computer 1100 comprises a processor 1130 as well as memory 1140 for storing various programs 1144 and data 1146. The memory 1140 may also store an operating system 1142 supporting the programs 1144.

The processor 1130 cooperates with conventional support circuitry such as power supplies, clock circuits, cache memory and the like as well as circuits that assist in executing the software routines stored in the memory 1140. As such, it is contemplated that some of the steps discussed herein as software methods may be implemented within hardware, for example, as circuitry that cooperates with the processor 1130 to perform various method steps. The computer 1100 also contains input/output (I/O) circuitry that forms an interface between the various functional elements communicating with the computer 1100.

Although the computer 1100 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other data bearing medium, and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A tangible and non-transient computer readable storage medium for storing instructions which, when executed by a processor at a forwarding element (FE), perform a method, comprising:

routing packets according to a routing protocol process via a routing path associated with an active control element (CE) dynamically bound to the FE, said FE and any CE, including at least said active CE and at least one backup CE comprising different network elements running a common instance of said routing protocol process, wherein said active CE and said FE are separated by multiple hops and said FE discovering said active CE using a softrouter architecture discovery protocol to become dynamically bound and maintain said dynamic binding and said routing path using a load balancing of the active CE serving a plurality of FEs including said FE;

processing protocol messages associated with the routing protocol process according to a protocol overlay process, said protocol overlay process comprising:

forwarding, toward the at least one backup CE, each routing protocol message received from the active CE and each routing protocol message transmitted toward the active CE;

periodically transmitting a heartbeat message toward the active CE according to a communication protocol heartbeat message; and in response to a failure to receive acknowledgment of the heartbeat message, performing a failover from the active CE to the at least one backup CE, said at least one backup CE becoming a new active CE with respect to the FE.

2. The computer readable storage medium of claim 1, wherein the communication protocol comprises one of a stream control transmission protocol (SCTP) and a transmission control protocol (TCP).

3. The computer readable storage medium of claim 1, wherein the routing protocol process comprises any of an open shortest path first (OSPF) protocol, an intermediate system to intermediate system (IS-IS) protocol, a routing information protocol (RIP), an enhanced interior gateway routing protocol (EIGRP) and a border gateway protocol (BGP).

4. The computer readable storage medium of claim 1, wherein the protocol overlay process further comprises:

in response to a received checkpoint message, propagating a checkpoint message toward said at least one backup CE, said checkpoint message configured to cause a protocol state update.

5. The computer readable storage medium of claim 1, wherein the protocol overlay process further comprises:

encapsulating each routing protocol message forwarded toward a CE according to a protocol overlay format including a source FE identifier, a destination CE identifier, a routing protocol identifier and a sequence number.

6. The computer readable storage medium of claim 5, wherein the protocol overlay format further includes a checkpoint message identifier.

7. The computer readable storage medium of claim 5, wherein the protocol overlay format further includes said heartbeat message.

8. The computer readable storage medium of claim 1, wherein the protocol overlay process further comprises:

in response to receiving said each routing protocol message from the active CE and the at least one backup CE, forwarding toward the respective CE a corresponding acknowledgment message.

9. The computer readable storage medium of claim 8, wherein the protocol overlay process further comprises:

storing corresponding routing protocol messages received from the active CE; and dropping corresponding routing protocol messages received from the at least one backup CE.

10. The computer readable storage medium of claim 1, wherein said failover of said protocol overlay process comprises:

forwarding, toward said at least one backup CE, a message adapted to trigger a synchronization between said at least one backup CE and said FE.

11. The computer readable storage medium of claim 1, wherein said failover of said protocol overlay process comprises:
   forwarding, toward said at least one backup CE, a message adapted to trigger a synchronization between said at least one backup CE and said FE at a state associated with a previously propagated checkpoint message.

12. The computer readable storage medium of claim 1, wherein said failover of said protocol overlay process further comprises:
   forwarding, toward said at least one backup CE, corresponding routing protocol messages received from an active CE after a previously received checkpoint message.

13. The computer readable storage medium of claim 1, wherein said failover of said protocol overlay process further comprises:
   forwarding, toward said backup CE, stored routing protocol messages received from the failed active CE.

14. A method, comprising:
   at a forwarding element, routing packets according to a routing protocol process via a routing path associated with an active control element (CE) dynamically bound to a FE, said FE and any CE, including at least said active CE and at least one backup CE comprising different network elements running a common instance of said routing protocol process, wherein said active CE and said FE are separated by multiple hops and said FE said FE discovering said active CE using a softrouter architecture discovery protocol to become dynamically bound and maintain said dynamic binding and said routing path using a load balancing of the active CE serving a plurality of FEs including said FE; and
   at the forwarding element, processing protocol messages associated with the routing protocol process according to a protocol overlay process, said protocol overlay process comprising:
      forwarding, toward the at least one backup CE, each routing protocol message received from the active CE and each routing protocol message transmitted toward the active CE;
      periodically transmitting a heartbeat message toward the active CE according to a communication protocol heartbeat message; and
      in response to a failure to receive acknowledgment of the heartbeat message, performing a failover from the active CE to the at least one backup CE, said at least one backup CE becoming a new active CE with respect to the FE.

15. A forwarding element, comprising a processor configured for:
   routing packets according to a routing protocol process via a routing path associated with an active control element (CE) dynamically bound to a FE, said FE and any CE, including at least said active CE and at least one backup CE comprising different network elements running a common instance of said routing protocol process, wherein said active CE and said FE are separated by multiple hops and said FE discovering said active CE using a softrouter architecture discovery protocol to become dynamically bound and maintain said dynamic binding and said routing path using a load balancing of the active CE serving a plurality of FEs including said FE; and
   processing protocol messages associated with the routing protocol process according to a protocol overlay process, said protocol overlay process comprising:
      forwarding, toward the at least one backup CE, each routing protocol message received from the active CE and each routing protocol message transmitted toward the active CE;
      periodically transmitting a heartbeat message toward the active CE according to a communication protocol heartbeat message; and
      in response to a failure to receive acknowledgment of the heartbeat message, performing a failover from the active CE to the at least one backup CE, said at least one backup CE becoming a new active CE with respect to the FE.

* * * * *